United States Patent
Walker et al.

(10) Patent No.: US 8,005,418 B2
(45) Date of Patent: Aug. 23, 2011

(54) VEHICLE ORIENTED SWITCHED ANTENNA SYSTEM

(75) Inventors: Glenn A. Walker, Greentown, IN (US); Duane E. Mateychuk, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 1564 days.

(21) Appl. No.: 10/924,409

(22) Filed: Aug. 24, 2004

(65) Prior Publication Data
US 2006/0046639 A1    Mar. 2, 2006

(51) Int. Cl.
*H04H 20/74* (2008.01)
(52) U.S. Cl. .............. 455/3.02; 455/3.01; 455/3.06
(58) Field of Classification Search ......... 455/3.02, 455/429, 12.1, 345, 3.01, 3.06; 342/372, 342/374
See application file for complete search history.

(56) References Cited

U.S. PATENT DOCUMENTS

| | | | | |
|---|---|---|---|---|
| 5,349,360 A | * | 9/1994 | Matsui | 342/374 |
| 5,471,219 A | * | 11/1995 | Rodeffer et al. | 342/359 |
| 6,640,085 B1 | * | 10/2003 | Chatzipetros et al. | 455/3.02 |
| 2002/0028654 A1 | | 3/2002 | Gleyzes et al. | |
| 2002/0154059 A1 | | 10/2002 | Lindenmeier et al. | |

FOREIGN PATENT DOCUMENTS

| | | |
|---|---|---|
| EP | 0999661 | 5/2000 |
| WO | 9852300 | 11/1998 |

OTHER PUBLICATIONS

European Search Report dated Jan. 9, 2009.

* cited by examiner

*Primary Examiner* — Edward Urban
*Assistant Examiner* — Fayyaz Alam
(74) *Attorney, Agent, or Firm* — Jimmy L. Funke

(57) ABSTRACT

An antenna system is provided having switched directional antennas. The antenna system includes a first antenna for receiving signals within a first directional coverage zone, and a second antenna for receiving signals within a second directional coverage zone. According to one embodiment, the first and second antennas are located on a vehicle. The system has a device to detect orientation of the vehicle. The system further includes a receiver having control circuitry for controlling selection of the signals received from the first and second antennas based on orientation of the vehicle, location of one or more sources, and antenna coverage zones for the first and second antennas.

3 Claims, 5 Drawing Sheets

VEHICLE ORIENTED SWITCHED ANTENNA SYSTEM

TECHNICAL FIELD

The present invention generally relates to antennas and, more particularly, to a vehicle mounted antenna system and method of selectively communicating signals with remote transmission sources, such as satellites.

BACKGROUND OF THE INVENTION

Automotive vehicles are commonly equipped with various signal communication devices such as audio radios for receiving broadcast radio frequency (RF) signals, processing the RF signals, and broadcasting audio information to passengers in the vehicle. Satellite digital audio radio (SDAR) services have become available that offer digital radio service covering a large geographic area, such as North America. Currently, a couple of satellite-based digital audio radio services are available in North America. These SDAR services are referred to as Sirius satellite radio which employs three satellites in elliptical orbit and XM satellite radio which employs two satellites in geo-stationary orbit. Both services receive uplinked programming which, in turn, is rebroadcast directly to digital radios that subscribe to the service. Each subscriber to the SDAR service generally includes a digital radio having a receiver and one or more antennas for receiving the digital broadcast.

In the SDAR services system, the radio receivers are generally programmed to receive and decode the digital data signals, which typically include many channels of digital audio. In addition to broadcasting the encoded digital quality audio signals, the SDAR service may also transmit data that may be used for various other applications. The broadcast signals may include information for advertising, informing the driver of warranty issues, providing information about the broadcast audio information, and providing news, sports, and entertainment broadcasting. Thus, the digital broadcasts may be employed for any of a number of satellite audio radio, satellite television, satellite Internet, and various other consumer services.

In vehicles equipped with the SDAR service, each vehicle generally includes one or more antennas for receiving the satellite digital broadcast. One example of an antenna arrangement includes one or more antennas mounted in the outside rearview mirror housing(s) of the vehicle. Another antenna arrangement includes a thin phase network antenna having a plurality of antenna elements mounted on the roof of the vehicle. The SDAR antenna(s) may be mounted elsewhere in the vehicle.

As the antenna profiles for the SDAR services systems become smaller, performance of the antenna may be reduced. To regain this lost performance, multiple small directional antennas may be used that compliment each other. This type of antenna system relies on switching to the best antenna source for the signal reception. Another option is to combine the antenna with beam steering electronics. For low cost application, a switched diversity antenna may be employed. In doing so, the RF receiver controls which antenna to use by detecting the presence of a desired signal.

A system that uses only one type of signal detection (i.e., signal quality detection in the receiver) generally must switch to another antenna when the signal is lost. This switching approach is generally referred to as blind switching because there is generally no information considered from the other antenna(s) to indicate the probability of success in finding a better desired signal. When the antenna employed has a weak signal, if the receiver switches to another antenna that exhibits a poorer quality signal or no signal, reduced antenna performance may be experienced. This may result in a loss of information which, in an audio radio, can result in audio mute. Hence, the conventional blind switching technique requires the receiver to wait longer before switching and requires the receiver to quickly determine if the new antenna has a valid signal.

It is therefore desirable to provide for an antenna system that allows for selective control to achieve optimal signal reception from a plurality of transmission sources. In particular, it is desirable to provide for an antenna system that advantageously allows for enhanced selection of received signals for use on a mobile vehicle.

SUMMARY OF THE INVENTION

In accordance with one aspect of the present invention, an antenna communication system is provided. The system includes a first antenna for communicating signals within a first directional coverage zone and a second antenna for communicating signals within a second directional coverage zone. According to one embodiment, the first and second antennas are located on a vehicle. The system has a device to detect orientation (direction) of the vehicle. The system further includes control circuitry for controlling selection of the signals communicated with the first and second antennas based on the orientation of the first and second antennas, location of one or more remote signal communication devices, and antenna coverage patterns for the first and second antennas.

According to another aspect of the present invention, a method of selectively processing signals from multiple antennas is provided. The method includes the steps of providing a first antenna for communicating signals within a first directional coverage zone and providing a second antenna for communicating signals within a second directional coverage zone. The method also includes the steps of determining orientation of the first and second antennas, determining location of one or more remote signal communication devices, and storing coverage patterns for the first and second antennas. The method further includes the steps of selecting signals communicating with the first and second antennas based on orientation of the first and second antennas, the location of the one or more remote signal communication devices, and the antenna coverage patterns for the first and second antennas.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
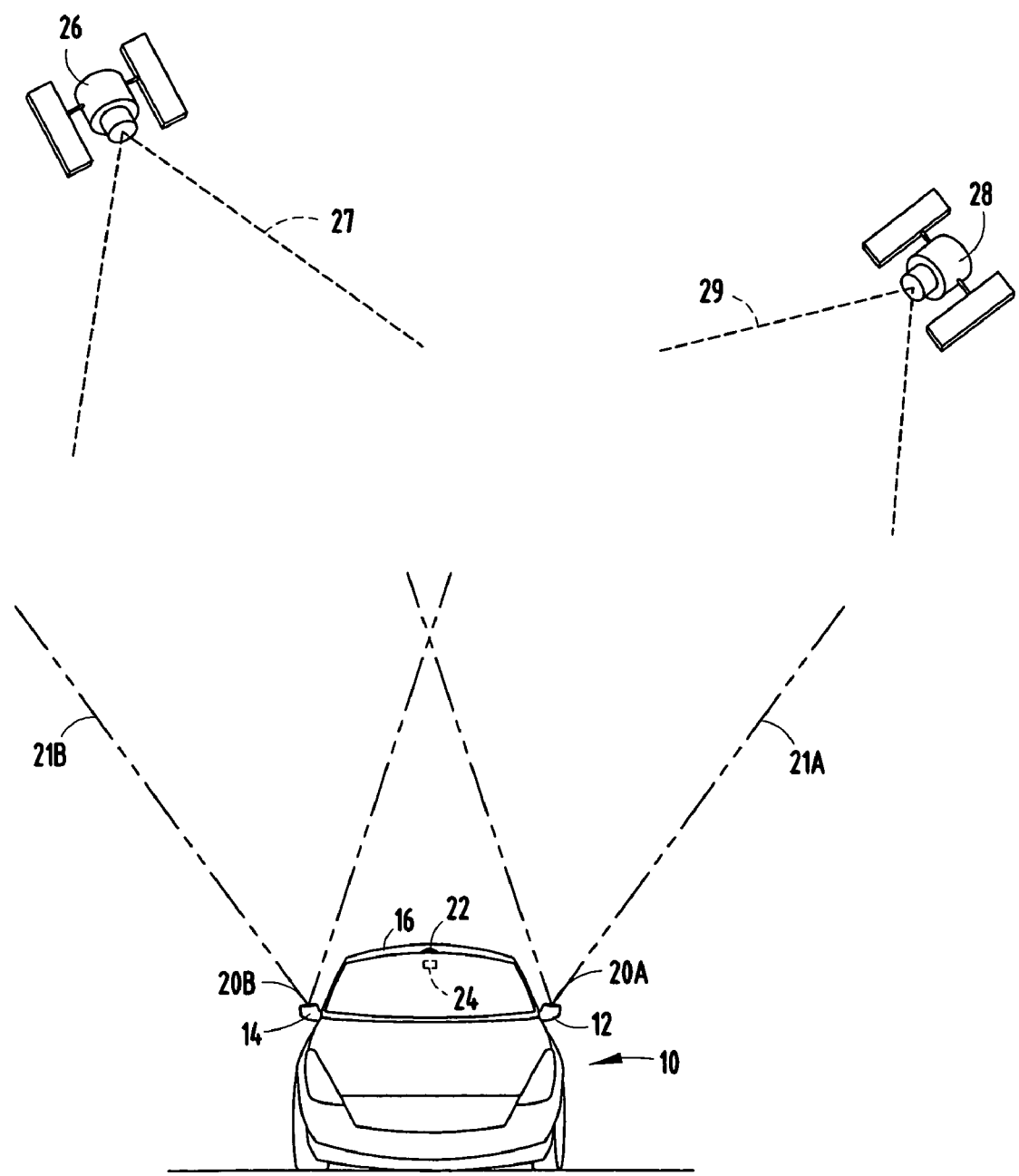
FIG. 1 is a schematic representation of a vehicle equipped with multiple antennas for receiving satellite-broadcast SDAR services.

Referring to FIG. 1, a vehicle 10 is generally illustrated equipped with a satellite based digital audio radio (SDAR) service, according to one embodiment. The SDAR service may be used to provide any of a number of consumer services including radio, television, Internet, and other data broadcast services. Currently, two SDAR service systems are in place in North America and are commercially referred to as Sirius satellite radio and XM satellite radio, both of which employ at least two satellites for transmitting streams of data to subscribers. The SDAR service system shown includes first and second satellites 26 and 28 broadcasting streams of data in first and second transmit zones 27 and 29, respectively. Satellites 26 and 28 are known to broadcast streams of data over a substantial beam pattern and may be directional beam patterns to cover select geographic regions.

The vehicle 10 is equipped with a receiver system, including signal receivers in the form of first and second antennas 20A and 20B for receiving radio frequency (RF) signals broadcast by satellites 26 and 28. The first and second antennas 20A and 20B are shown mounted on the upper side of the exterior rearview mirrors on opposite sides of the vehicle 10. In the embodiment shown, the antenna system employs two separate antennas 20A and 20B each of which are directional pointing antennas. The antenna 20A has a first directional signal coverage zone 21A, while antenna 20B has a second directional signal coverage zone 21B. The first and second directional signal coverage zones 21A and 21B are centered in different directions and each covers only a portion of the hemisphere. It should be appreciated that any of a number of antennas and antenna arrangements may be employed on various locations of the vehicle 10 for receiving and/or transmitting signals to communicate with remote satellites and/or terrestrial-based communication devices.

The vehicle 10 is further illustrated including a global positioning system (GPS) receiver 22 shown mounted on the roof 16. The GPS receiver 22 provides a signal indicative of position of the vehicle 10 and orientation (direction) of the vehicle 10 when the vehicle 10 is in motion. The vehicle 10 may further include a compass 24 for providing a directional heading, particularly when the vehicle 10 is not moving.

Figure 2:
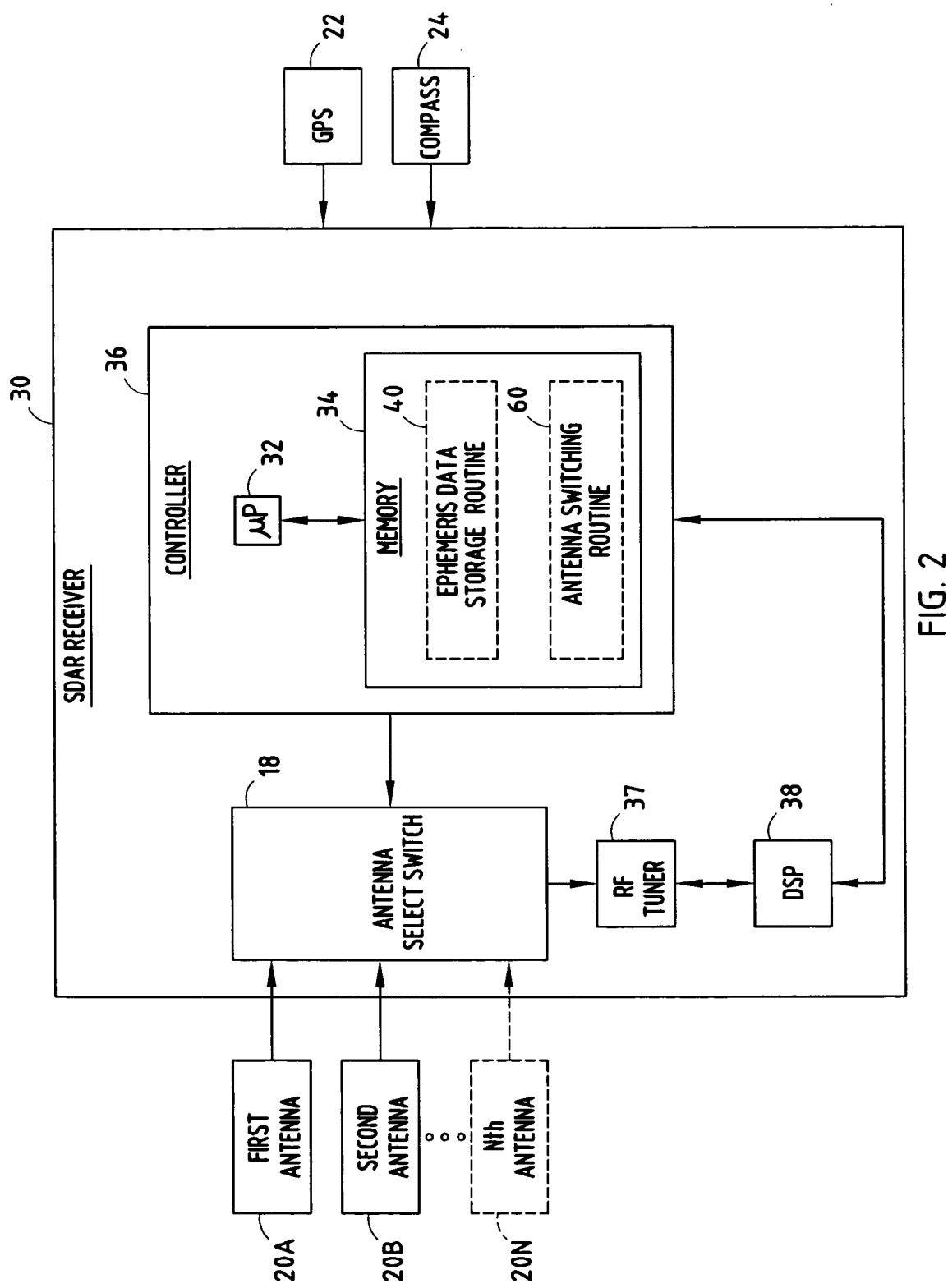
FIG. 2 is a block diagram illustrating an SDAR communication (e.g., receiver) system for selecting and processing the signals received with the antennas according to one embodiment.

The vehicle 10 further includes an SDAR receiver 30 shown in FIG. 2 according to a first embodiment. The SDAR receiver 30 has inputs for receiving RF signals containing streams of broadcast data received from each of the antennas 20A-20N. The input signals from N number of antennas 20A-20N may be received via satellite or terrestrial based broadcast signals. The SDAR receiver 30 is further shown receiving signals from a global positioning system (GPS) 22 and a compass 24.

The SDAR receiver 30 is configured to receive digital signals from the antennas and process the digital signals, to selectively switch between the digital signals, and to process the selected digital signals. The receiver 30 includes an antenna select switch 18 for selecting which of the output signals from antennas 20A-20N to select for processing. Additionally, the receiver 30 includes an RF tuner 37 receiving the selected signals from one of antennas 20A-20N. The RF tuner 37 selects a frequency bandwidth of the digital audio and/or other data to pass RF signals within a tuned frequency bandwidth. The receiver 30 further includes a digital signal processor (DSP) 38 which processes the tuned frequency signals, including demodulating and decoding the signals to extract time division multiplexed (TDM) digital data from the received, selected and tuned signals.

The receiver 30 is further shown including a controller 36 having a microprocessor 32 and memory 34. The microprocessor 32 may include a conventional microprocessor having the capability for processing routines and data as described herein. The memory 34 may include read-only memory (ROM), random access memory (RAM), flash memory, and other commercially available volatile and non-volatile memory devices. Stored within memory 34 and processed by microprocessor 32 is ephemeris data storage routine 40 for selecting ephemeris data pertaining to the satellite and an antenna switching routine 60 for selecting one of the antennas for processing according to the present invention. The microprocessor 32 may alternately be in the form of alternative digital or analog circuitry.

In the embodiment shown in FIG. 2, the controller 36 processes the known or expected location of the transmitted signal source(s) (e.g., satellites) from the ephemeris data, the general location and orientation of the vehicle 10, and the antenna patterns for each of the antennas. The controller 36 may process the current time of day and to determine where the satellites are located. The controller 36 then selectively switches to select signals from one of the antennas 20A-20N so as to realize a high probability of high signal reception quality. In the first embodiment, the antennas 20A-20N are separate distinct antennas.

Figure 3:
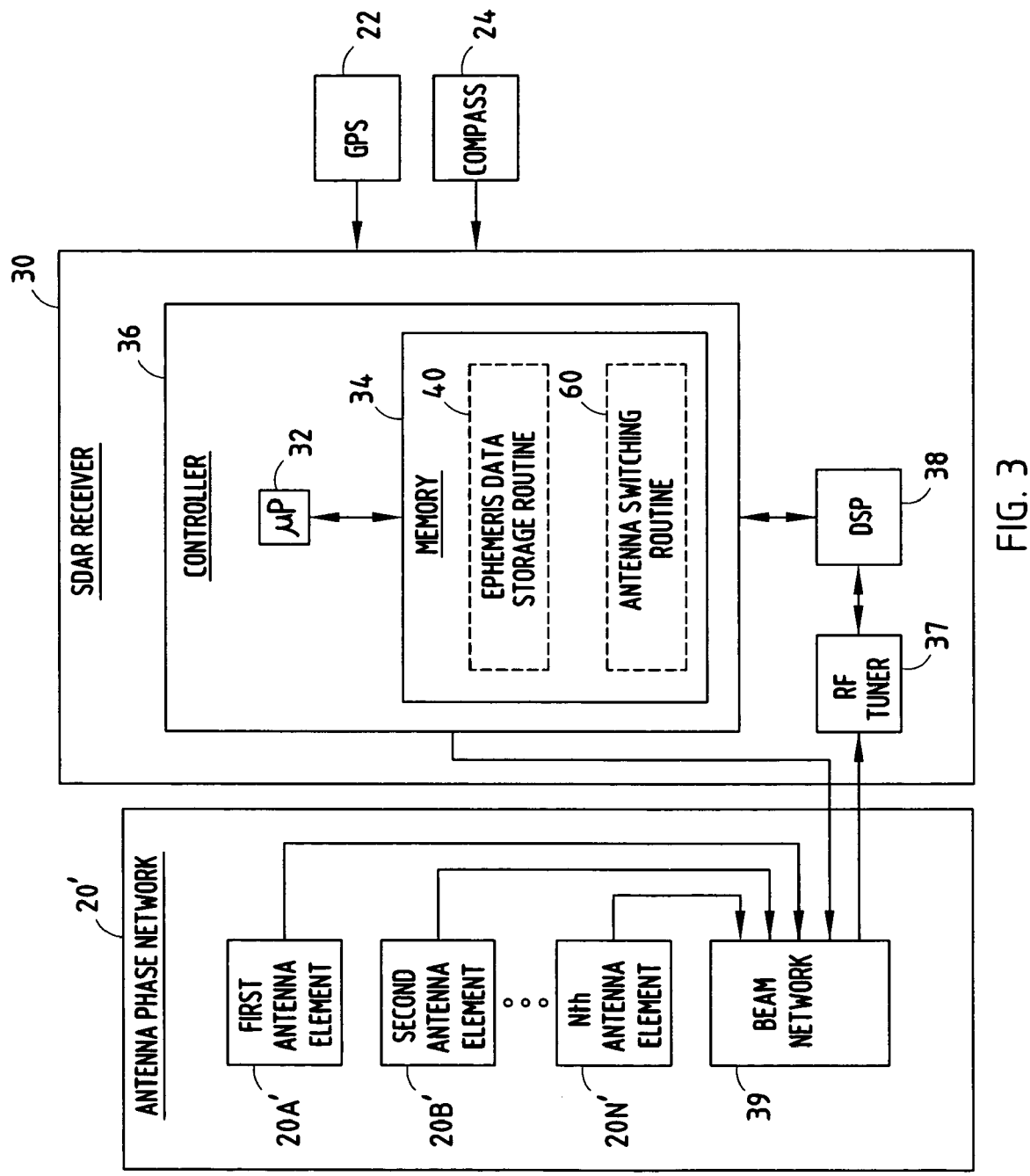
FIG. 3 is a block diagram illustrating an SDAR receiver system for selecting and processing signals received by an antenna phase network having multiple antenna elements according to another embodiment.

Referring to FIG. 3, an antenna phase network 20' is shown selectively controlled by receiver 30 according to a second embodiment. In this embodiment, the antenna phase network 20' includes a plurality of antenna elements including elements 20A'-20N', each of which alone or in combination may be considered an antenna. Each of the antenna elements 20A-20N are formed as a network that may be selectively controlled via a beam network 39 to control the beam pattern of the resultant antenna network. Each of the antenna elements 20A'-20N' may be employed individually or selectively interconnected in a network by the beam network 39 to provide a plurality of distinct antenna patterns, each having a distinct antenna pattern to select from.

The SDAR receiver 30 shown in the second embodiment of FIG. 3 processes the same data as explained in connection with the first embodiment in FIG. 2, with the following exception. Instead of controlling an antenna select switch to select from multiple separate antennas, the receiver 30 controls the beam network 39 within the antenna phase network 20' to select one of the outputs of the antenna phase network 20'. The beam network 39 may select individual antenna elements of network 20' or from different combinations of antenna elements of network 20' to select signals in an optimal coverage zone based on the processed data.

Figure 4:
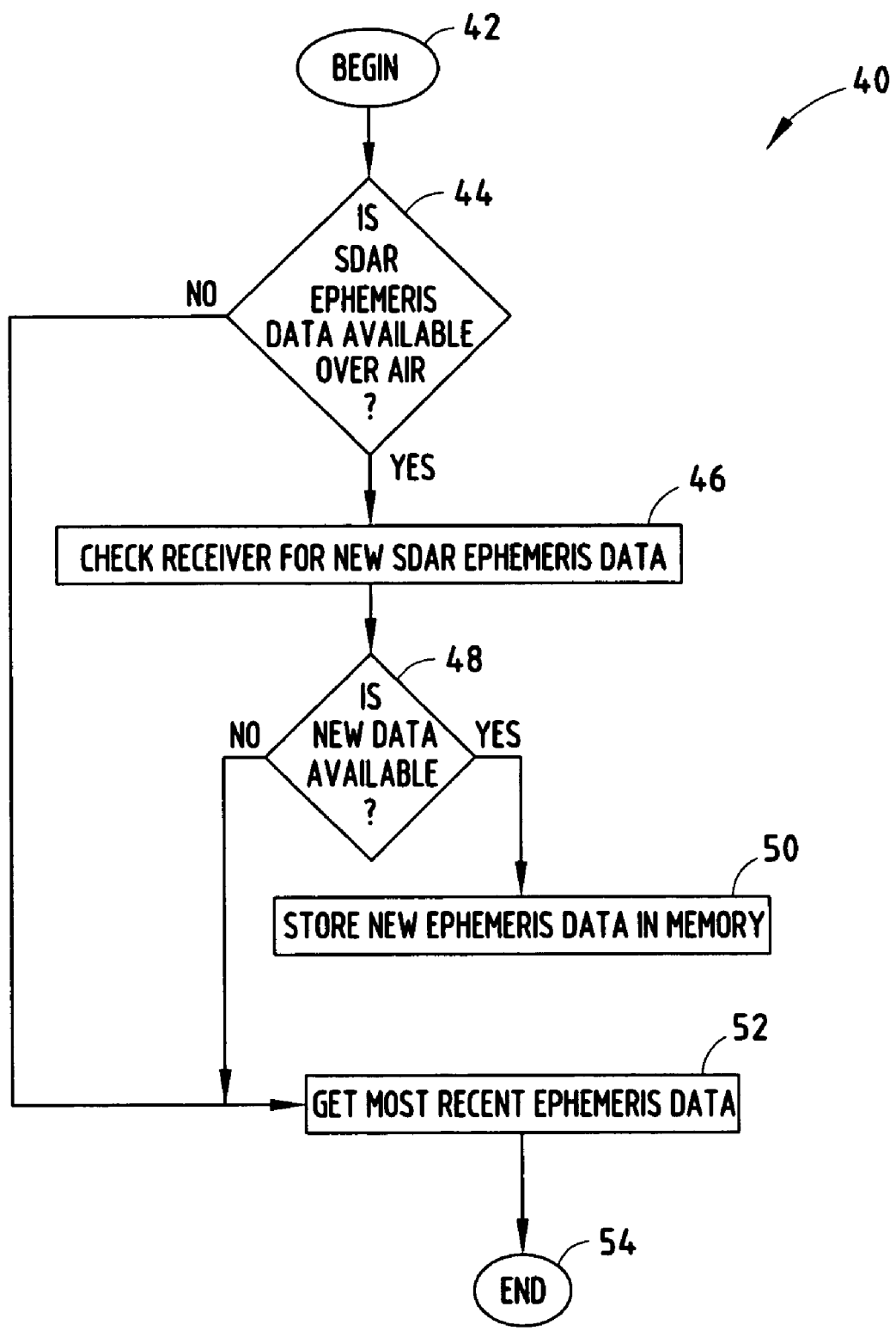
FIG. 4 is a flow diagram illustrating a routine for obtaining SDAR ephemeris data for the satellites.

Referring to FIG. 4, a routine 40 is shown for obtaining the ephemeris data from the transmitting sources which, in the embodiments shown, are the SDAR satellites 20A and 20B transmitting multiple streams of digital data. Routine 40 begins at step 42 and proceeds to decision step 44 to determine if the SDAR ephemeris data of the satellites is available over the airwaves and, if so, checks the receiver for the new SDAR ephemeris data received in block 46. The SDAR ephemeris data generally includes the location of each of the satellites, the velocity including trajectory of each of the satellites, the time of day, and the coverage zone for each of the satellites. If the SDAR ephemeris data is not transmit over the airwaves from the satellites, routine 40 proceeds to step 52 to get the most recent ephemeris data in block 52 which is stored in memory.

Upon receiving new SDAR ephemeris data, routine 40 proceeds to decision step 48 to determine if the new data is available and, if so, stores the new ephemeris data in memory in step 50. If the new data is not available, routine 40 advances to step 52 to get the most recent ephemeris data previously stored in memory. Once the ephemeris data for the satellites is acquired, routine 40 ends at step 54.

Figure 5:
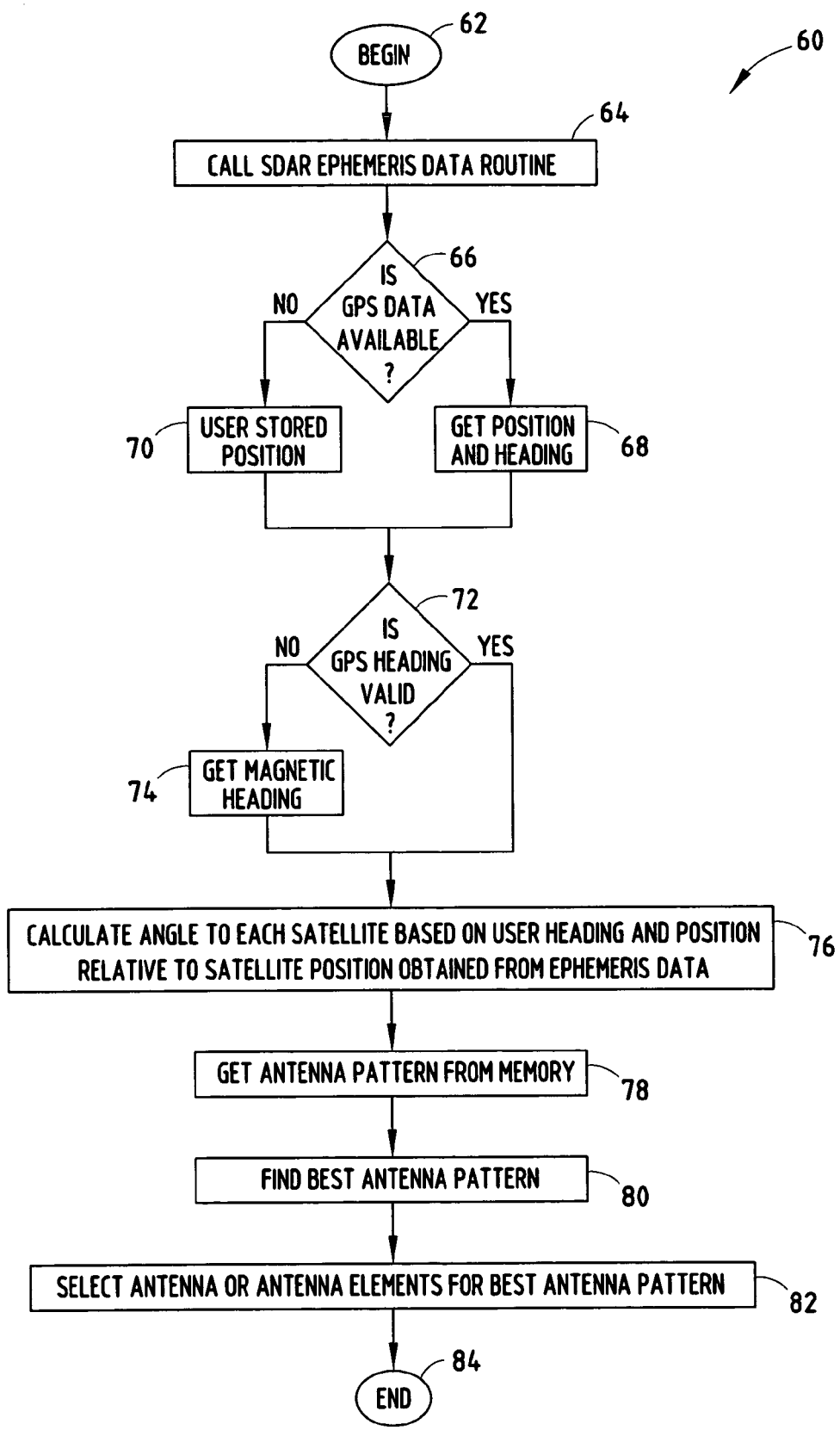
FIG. 5 is a flow diagram illustrating a routine for selecting from the antennas or antenna elements to obtain optimal signal reception performance according to the present invention.

Referring to FIG. 5, routine 60 is shown for selecting the antenna or antenna elements to be used to receive and process data for use in the SDAR communication system. Routine 60 begins at step 62 and calls for execution of the SDAR ephemeris data routine 40 in step 64. The SDAR ephemeris data obtains the ephemeris data for each of the satellites as discussed in connection with FIG. 4.

Routine 60 then proceeds to decision step 66 to determine if the GPS data is available. If GPS data is available, the position and orientation (heading) of the vehicle 10 are acquired from the GPS data in step 68. The orientation (heading) may alternately be obtained from a magnetic compass. If GPS data is not available, routine 60 may employ a user stored position in step 70.

Next, routine 60 proceeds to determine if the GPS heading is valid and, if not, a magnetic heading is acquired in step 74. The GPS heading may be acquired from a compass or other orientation (direction heading) acquisition device. It should be appreciated that if the vehicle 10 is not moving, the GPS data may not provide an accurate directional heading and, hence, the compass may be used to provide the orientation of the vehicle. By providing orientation of the vehicle, routine 60 likewise knows the orientation of the first and second antennas that are fixed on the vehicle.

Once the GPS heading and ephemeris data are acquired, routine 60 proceeds to calculate an angle defining a path to each satellite based on the user orientation and position relative to the position of each satellite obtained from the ephemeris data in step 76. The angle may be calculated by using any reference coordinate system, e.g., Earth Centered Inertial (ECI), Earth Centered Earth Fixed (ECEF), World Geodetic System (WGS-84), etc. Next, routine 60 acquires the coverage zone pattern for each of the antennas or the beam network antenna configurations from memory in step 78. Routine 60 then finds the best or optimal antenna pattern in step 80. The optimal antenna or antenna elements are then selected for the best antenna pattern in step 82, before completing the routine 60 in step 84.

The selection of the optimal antenna pattern includes determining which antenna to select from according to the embodiment shown in FIG. 2, or which beam network configuration of antenna elements to select from according to the embodiment shown in FIG. 3. By selecting the best or optimum antenna pattern, a high probability of optimal continuous signal reception and availability of data may be provided.

It should be appreciated that routine 60 is continually repeated to determine the optimal antenna pattern to select from. While the signal reception system of the present invention has been described in connection with an SDAR receiver system, it should be appreciated that present invention may be applicable to other signal reception and/or transmission systems that employ a plurality of directional pointing antennas or antenna elements. By selecting the optimal antenna or antenna elements, the present invention advantageously provides for a reduced cost antenna system that does not require expensive and complicated beam steering electronics.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A switched antenna signal communication system comprising:
   a first antenna for communicating signals within a first directional coverage zone;
   a second antenna for communicating signals within a second directional coverage zone;
   a device for providing an orientation of the first and second antennas, wherein the orientation is a compass heading;
   a controller for controlling the selection of the signals communicated with the first and second antennas based on the orientation of the first and second antennas, location of one or more remote signal communication devices, and the first and second coverage zones for the first and second antennas.

2. A switched antenna signal receiver system on a vehicle comprising:
   a first antenna mounted on the vehicle for receiving signals within a first directional coverage zone;
   a second antenna mounted on the vehicle for receiving signals within a second directional coverage zone;
   a device for determining an orientation of the vehicle, wherein the orientation is a compass heading of the vehicle; and
   a receiver comprising control circuitry for controlling selection of signals received from the first and second antennas based on the orientation of the vehicle, location of one or more remote signal transmitting sources, and the first and second coverage zones for the first and second antennas.

3. A method of selectively switching to process signals from multiple antennas, said method comprising the steps of:
   providing a first antenna for communicating signals within a first directional coverage zone;
   providing a second antenna for communicating signals within a second directional coverage zone;
   determining orientation of the first and second antennas, wherein the orientation is a compass heading;
   determining location of one or more remote signal communication devices;
   storing the antennas coverage zones for the first and second antennas; and
   selecting signals communicating with the first and second antennas based on the orientation of the first and second antennas, the location of the one or more remote signal communicating devices, and the antenna coverage zones for the first and second antennas.

* * * * *